April 12, 1927.　　　R. B. BAGBY　　　1,624,572
FLUSH VALVE FOR PASTEURIZERS
Filed Aug. 31, 1926　　　3 Sheets-Sheet 1
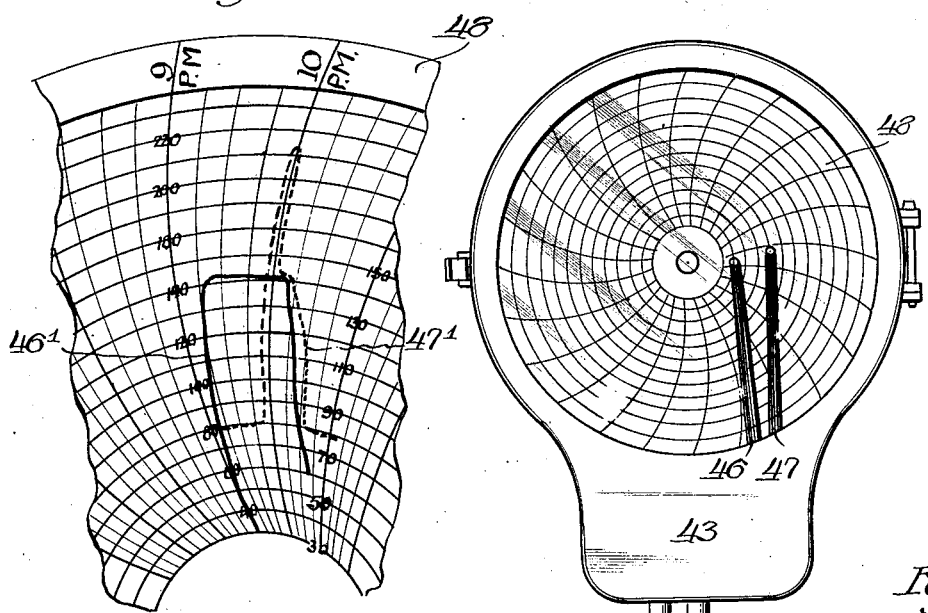
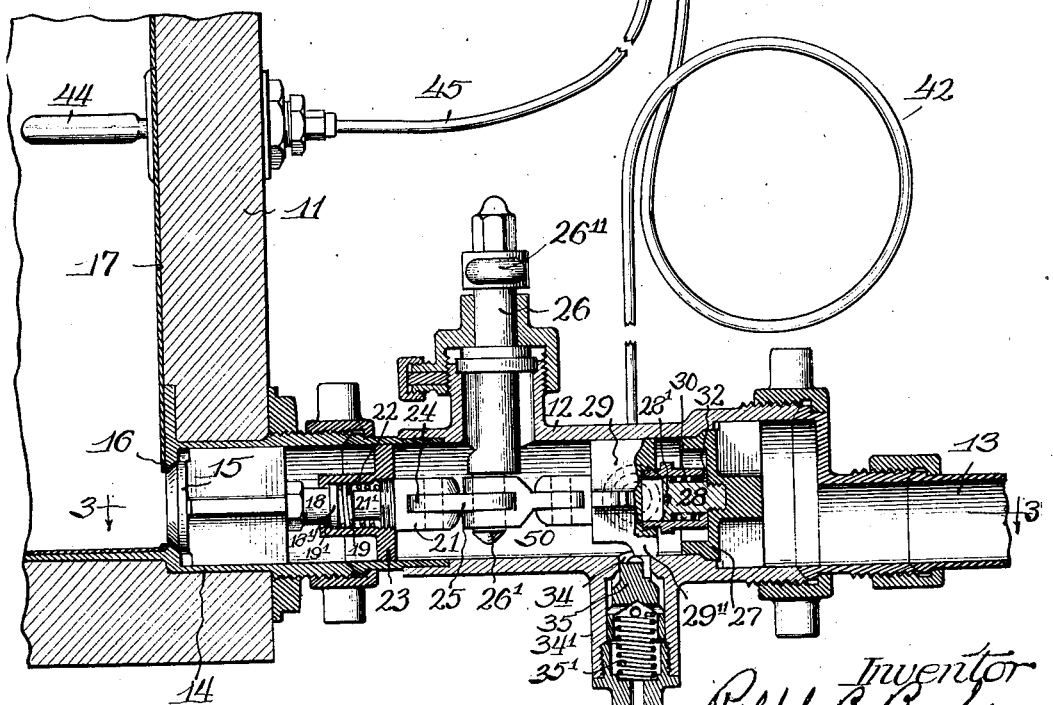

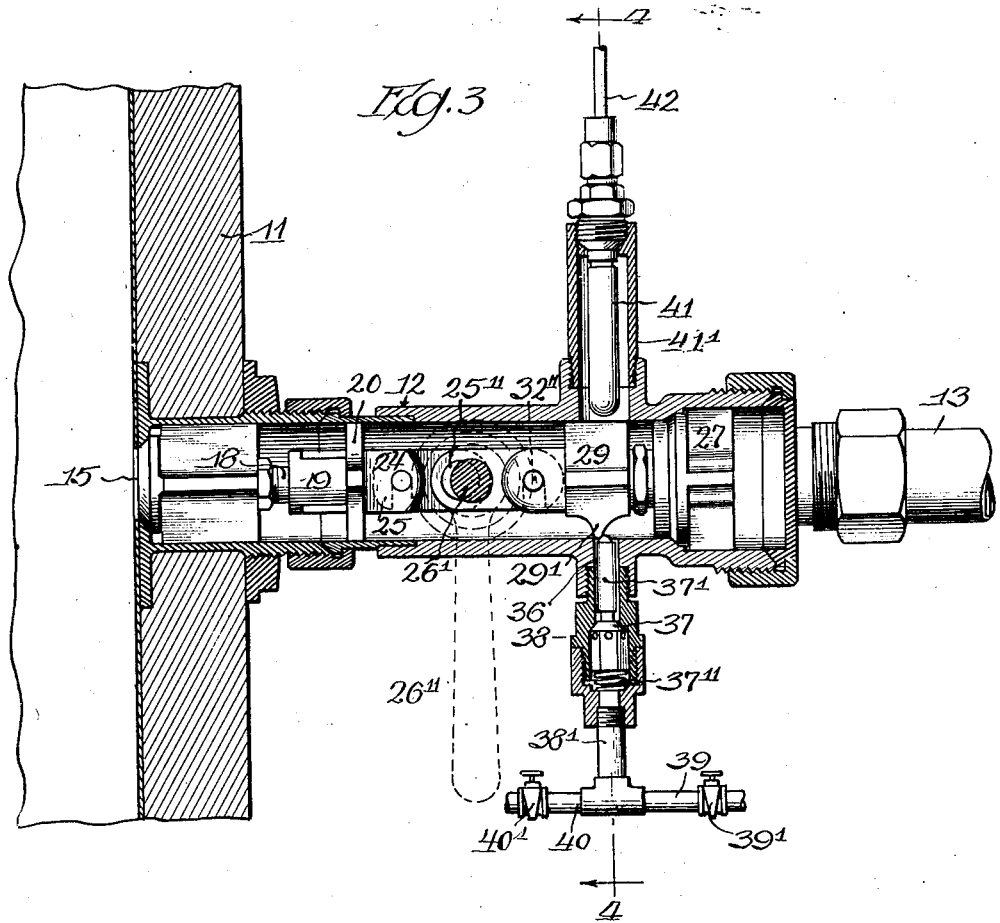
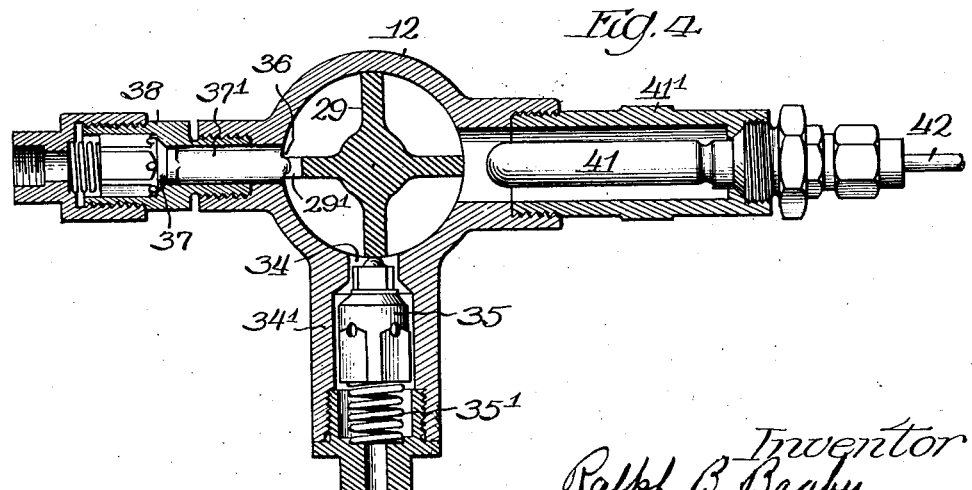

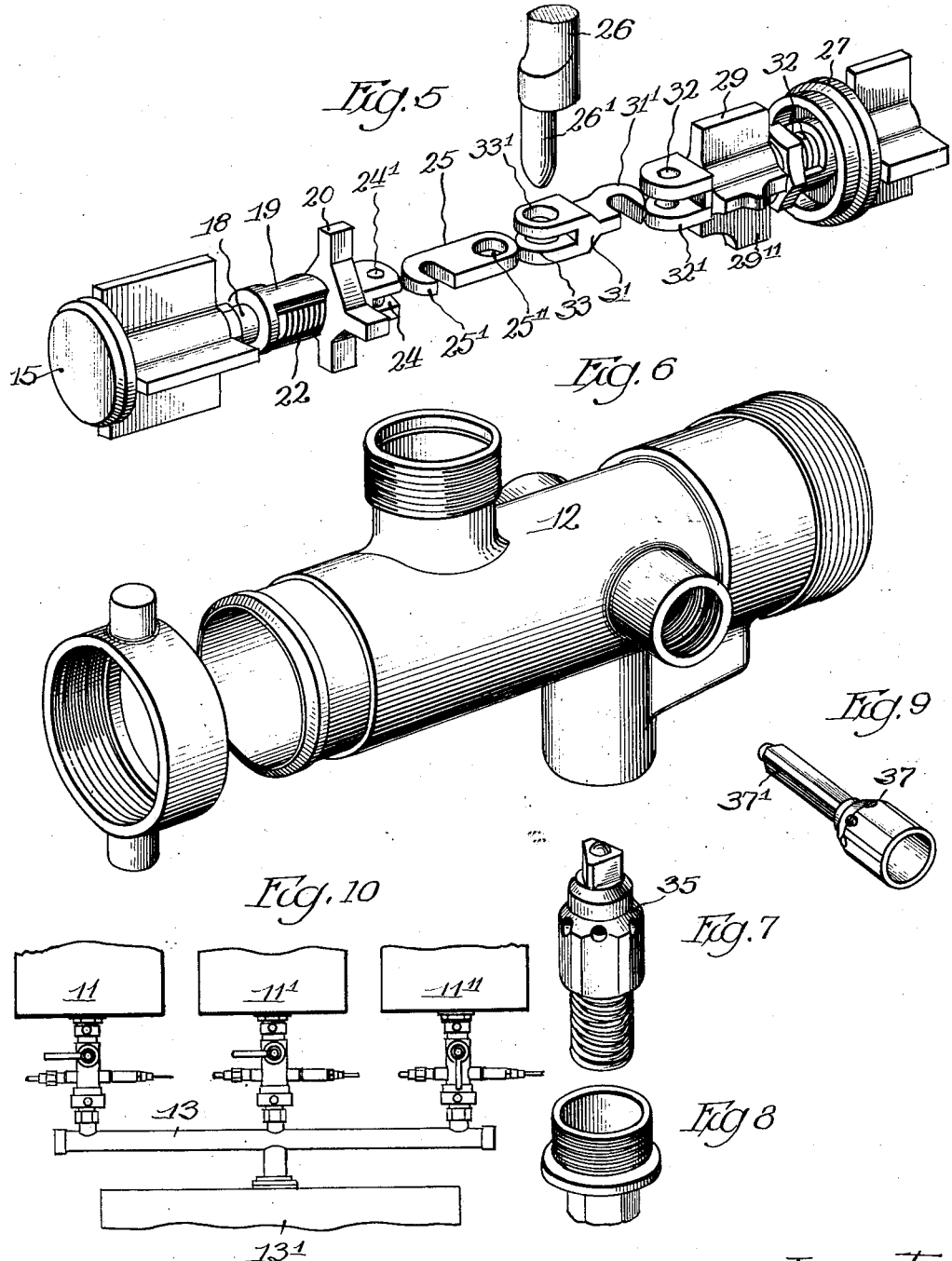

Patented Apr. 12, 1927.

1,624,572

UNITED STATES PATENT OFFICE.

RALPH B. BAGBY, OF CEDAR RAPIDS, IOWA, ASSIGNOR TO J. G. CHERRY COMPANY, OF CEDAR RAPIDS, IOWA, A CORPORATION OF IOWA.

FLUSH VALVE FOR PASTEURIZERS.

Application filed August 31, 1926. Serial No. 132,879.

This invention relates to apparatus for Pasteurizing milk and including a Pasteurizing tank, a pipe line connected with the tank to receive Pasteurized milk therefrom, and valve devices in the connection whereby the tank outlet and the pipe line inlet are opened and closed conjointly.

The object of this invention is to provide novel means of simple construction for closing the outlet from the Pasteurizer tank and the inlet to the pipe line to open a drip-leak while the tank valve and the pipe line valves are closed, to permit escape of leakage by the outlet valve, and to provide for sterilizing the chamber between the outlet valve and the pipe line valve preparatory to opening said valves.

The invention also has for its object to automatically make a time and temperature record of the Pasteurizing operation and of the sterilizing operation which may be preserved to show the condition of the milk and as a check upon the operator to insure proper attention to his duties.

In the accompanying drawings I have shown a selected embodiment of the invention and referring thereto:

Fig. 1 is a sectional elevation as it appears in actual use.

Fig. 2 is a detail view showing a specimen record.

Fig. 3 is a horizontal sectional view on the line 3—3 of Fig. 1.

Fig. 4 is a vertical sectional view on the line 4, 4 of Fig. 3.

Fig. 5 is a perspective view showing parts of the invention detached but in their proper relation.

Fig. 6 is a perspective view of the casing.

Figs. 7, 8 and 9 are detail perspective views.

Fig. 10 is a diagrammatic view showing the invention embodied in a battery of Pasteurizers.

Referring to the drawings 11 is a Pasteurizing tank which is connected by a casing 12 with the pipe line 13. The casing may, for convenience, be made in several parts connected fluid tight, one part 14 being permanently fitted in the end wall of the Pasteurizing tank to accommodate a flush valve 15 which engages a seat 16 around an opening in the lining 17. The tank outlet valve 15 has a stem 18 provided with a peripheral flange 18' and this stem projects into a housing 19 on the guide 20 which is slidably arranged within the casing. The flange 18' on the stem 18 engages an inturned flange 19' on one end of the housing 19. A plug 21 is screw threaded in the guide and it has an extension 21' which projects into the housing 19 to receive a spring 22 which is arranged within the housing between the end of the stem 18 and a shoulder 23 on the plug. The plug has a slotted end 24 to receive a link 25, and the latter has a hook 25' at one end to engage a pipe 24' passing through the slotted end 24 of the plug 21. A spindle 26 is mounted in the casing and it has a crank end 26' which engages an opening 25" in the link 25. The spindle 26 is opened by a handle 26" to open and close outlet tank valve 15. The guide 20 supports the parts in proper position in the casing and the spring 22 compensates for any inaccuracies of fit of the several parts.

A valve disk 27 engages a seat 27' on the casing adjacent the connection of the casing with the pipe line and this valve has a stem 28 with a peripheral flange 28' at its end. A guide 29 is arranged to slide in the casing and it is provided with a housing 30 having an inturned flange 31 at one end. A spring 32 is arranged on the stem 28 between the flange 28' and the flange 30'. A link 31 has a hook end 31' to engage a pin 32" in the slotted shoulder 32' on the guide 29. The link 31 has a slotted end 33 provided with an opening 33'. The link 25 is received in the slotted end 33 of the link 31, the openings 25" and 33' register, and the crank end 26' of the spindle 26 engages said openings to form a connection between the tank outlet valve devices and the pipe line inlet valve devices whereby they may be operated conjointly by rotation of the spindle. The guide 29 forms a support and guide for the parts connected therewith and the spring 32 compensates for inaccuracies of fit of the pipe line valve. The two guides 20 and 29 also serve to keep the valve disks 7 and 27 properly centered with respect to their valve seats 16 and 27' respectively.

The casing is provided with an opening 34 which communicates with a tubular extension 34'. A spring pressed valve 35 is arranged in this extension to close the opening 34. This provides a valved drip-leak between the tank outlet valve 15 and the pipe line valve 27 to permit the escape of leakage which may occur around the valves 15. The casing has another opening 36 and a spring pressed valve 37 is arranged in a housing 38 on the casing to close this opening. This housing connects with a pipe 38' which in turn connects with a steam pipe 39 having a valve 39' and with a water pipe 40 having a valve 40'. The valve 37 may be referred to as the sterilizing valve and it is provided with a stem 37' which is adapted to be projected by the spring 37'' through the opening 36 into the path of a cam 29' on the guide 29. The drip-leak valve 35 is also adapted to be projected by its spring 35' through the opening 34 in the casing into the path of a cam 29'' on the guide 29.

A thermal bulb 41 is mounted in an extension 41' on the casing, preferably diametrically opposite the sterilizing valve opening 36, and this bulb is connected by a tube 42 with a recorder 43. A thermal bulb 44 is arranged in the Pasteurizing tank and is connected by a tube 45 with the recorder 43. This recorder is provided with a pen 46 which is connected with the bulb 44, and with a pen 47 which is connected with the bulb 41. These pens are preferably equipped to make marks in inks of different color, on a chart 48, the marking made by the pen 46 being indicated by the full line 46' and the marking made by the pen 47 being indicated by the broken line 47', Fig. 2.

A plurality of Pasteurizing tanks 11, 11', 11'' may be connected with a pipe line 13 in the form of a header, which in turn is connected with a storage tank 13', Fig. 10.

In practice, the opening lever 26'' is turned to close the valves 15 and 27 and to open the valves 35 and 37; the tank is supplied with the liquid to be Pasteurized. It is practically impossible to make an outlet valve for the tank which will not leak a little during the Pasteurizing process and therefore the drip-leak is located between the valve 15 and the valve 27 and remains open while these valves are closed so that leakage by the valve 15 may drain out of the casing through the drip-leak. But it is contended that sufficient bacteria may be contained in a single drop or less of unpasteurized liquid to contaminate the contents of the liquid in the tank, usually milk. Whatever leakage there is by the valve 15 during the Pasteurizing process will be unpasteurized milk and some of it may adhere to the interior wall of the chamber 50 between the valves 15 and 27, and this may be sufficient to contaminate the Pasteurized milk in the tank when it is permitted to flow through the casing into the pipe line. Therefore, it is not only desirable to permit the escape of leakage but also to be able to sterilize the chamber between the valves 15 and 27 before they are opened so that this chamber will be in a sanitary condition to receive the flow of Pasteurized milk. After the Pasteurizing process is completed the chamber 50 may be washed out and sterilized by manipulating the valves 40' and 39' and then the operating handle 26'' may be turned to close the valves 35 and 37 and to open the valves 15 and 27. The valves 35 and 37 may close at the same time or provision may be made for closing the sterilizing valve 37 before closing the drip-leak valve 35 but the valves 15 and 27 should not be opened until the valves 35 and 37 are closed. The springs 22 and 32 provide for a sufficient movement of the cam guide 29 relative to the valves 15 and 27 to insure closing of the valves 35 and 37 before the valves 15 and 27 open.

The line 46' indicates the time and temperature of the sterilizing process and the line 47' indicates the time and temperature of the sterilizing process and these lines are marked on the chart to show the relation of the sterilizing process to the Pasteurizing process, thus the chart discloses at a glance whether or not the sterilizing process has been conducted at a proper time and in a proper manner to sterilize the chamber between the tank outlet valve and the pipe line valve before these valves are opened to permit the sterilized milk in the Pasteurizer to flow to the pipe line. The invention is of a special value in those places where Pasteurized milk only is permitted by ordinance to be sold. It insures the delivery of the Pasteurized milk to the pipe line without liability of contamination from any leakage which may occur during the Pasteurizing process around the tank outlet valve.

I have shown the invention herein in a form which I believe to be satisfactory for the purpose but I realize that changes in the construction and arrangement of parts may be made to adapt the invention to different conditions and for other reasons and I reserve the right to make all such changes as fall within the scope of the following claims:

I claim:

1. The combination of a Pasteurizing tank having an outlet, a pipe line, a connection between said outlet and said pipe line comprising a casing, valves in said casing for said outlet and said pipe line, a valved drip-leak in the casing between said tank outlet and pipe line valves, a crank arranged in the casing for opening and closing said tank outlet and pipe line valves conjointly, and flexible connections between the crank and said tank outlet and pipe line valves.

2. The combination of a Pasteurizing tank having an outlet, a pipe line, a connection between said outlet and said pipe line comprising a casing, valves in said casing for said outlet and said pipe line, a valved drip-leak in the casing between said tank outlet and pipe line valves, a crank arranged in the casing for opening and closing said tank outlet and pipe line valves conjointly, a flexible connection between the crank and said tank outlet and pipe line valves comprising a cam guide for operating the drip-leak valve, and a spring for each of said tank outlet and pipe line valves to permit a sufficient movement of said flexible connections independently of the tank outlet and pipe line valves to disengage the cam guide from the drip-leak valve and permit the closing of said valve before the tank outlet and pipe line valves are opened.

3. The combination of a Pasteurizing tank having an outlet, a pipe line, a connection between said outlet and said pipe line comprising a casing, valves in said casing for said outlet and said pipe line, a drip-leak in the casing between said valves, a crank arranged in the casing for opening and closing said valves conjointly, and a fluid connection between the crank and the tank outlet valve comprising a guide slidable in the casing, a plug on said guide, a link connection between the crank and said plug, a stem on the tank outlet valve, and a spring interposed between the stem and the plug.

4. The combination of a Pasteurizing tank having an outlet, a pipe line, a connection between said outlet and said pipe line comprising a casing, valves in said casing for said outlet and said pipe line, a drip-leak in the casing between said valves, a crank arranged in the casing for opening and closing said valves conjointly, and a fluid connection between the crank and the pipe line valve comprising a guide slidable in the casing, a crank connecting the guide to the crank, a stem on the pipe line valve, a housing on the guide, and a spring interposed between the stem and the housing.

5. The combination of a Pasteurizing tank having an outlet, a pipe line, a connection between said outlet and said pipe line comprising a casing, valves in said casing for said outlet and said pipe line, a valved drip-leak in the casing between said tank outlet and pipe line valves, a crank arranged in the casing for opening and closing said tank outlet and pipe line valves conjointly, and a flexible connection between the crank and the pipe line valve comprising a cam guide slidable in the casing for operating the drip-leak valve, a link connection between the guide and the crank, and a yielding connection between the guide and the pipe line valve.

6. The combination of a Pasteurizing tank having an outlet, a pipe line, a connection between said outlet and said pipe line comprising a casing, valves in said casing for said outlet and said pipe line, a valved drip-leak in the casing between said tank outlet and pipe line valves, a sterilizing valve in the casing between said tank outlet and pipe line valves, a crank arranged in the casing for opening and closing said tank outlet and pipe line valves conjointly, and a cam guide flexibly connected to the crank and to the pipe line valve for operating the drip-leak valve and sterilizing valve to permit said valves to close before the tank outlet and pipe line valves are opened.

RALPH B. BAGBY.